(12) United States Patent
Kent et al.

(10) Patent No.: US 12,210,716 B1
(45) Date of Patent: Jan. 28, 2025

(54) 5-WIRE RESISTIVE TOUCHSCREENS WITH METAL ELECTRODES

(71) Applicant: Elo Touch Solutions, Inc., Knoxville, TN (US)

(72) Inventors: Joel C. Kent, Fremont, CA (US); Ting-Chieh Chen, Taoyuan (TW); Wei-Wen Wang, Taipei (TW)

(73) Assignee: Elo Touch Solutions, Inc., Knoxville, TN (US)

( * ) Notice: Subject to any disclaimer, the term of this patent is extended or adjusted under 35 U.S.C. 154(b) by 0 days.

(21) Appl. No.: 18/509,605

(22) Filed: Nov. 15, 2023

(51) Int. Cl.
*G06F 3/045* (2006.01)

(52) U.S. Cl.
CPC .... *G06F 3/045* (2013.01); *G06F 2203/04103* (2013.01)

(58) Field of Classification Search
USPC .......................................................... 345/173
See application file for complete search history.

(56) References Cited

U.S. PATENT DOCUMENTS

| | | | | |
|---|---|---|---|---|
| 4,661,655 A * | 4/1987 | Gibson | ................... | G06F 3/045 178/18.05 |
| 4,687,885 A * | 8/1987 | Talmage, Jr. | ........... | G06F 3/045 178/18.05 |
| 4,725,695 A * | 2/1988 | Murdock | ................ | G06F 3/045 345/174 |
| 4,731,508 A * | 3/1988 | Gibson | ................... | G06F 3/045 178/18.05 |
| 4,822,957 A * | 4/1989 | Talmage, Jr. | ........... | G06F 3/045 178/18.05 |
| 5,050,035 A * | 9/1991 | Hegner | ................. | G01L 9/0075 361/283.4 |
| 6,452,479 B1 * | 9/2002 | Sandbach | ............... | G06F 3/045 338/114 |
| 2008/0309623 A1 * | 12/2008 | Hotelling | ............ | G06F 3/04164 345/173 |
| 2009/0322700 A1 * | 12/2009 | D'Souza | ................. | G06F 3/045 345/174 |
| 2018/0032169 A1 * | 2/2018 | Kwak | ................... | G06F 3/0445 |

* cited by examiner

*Primary Examiner* — Chineyere D Wills-Burns
(74) *Attorney, Agent, or Firm* — Sterne, Kessler, Goldstein & Fox P.L.L.C.

(57) ABSTRACT

A touch sensor includes a resistive layer on a substrate and electrodes on the resistive layer. The electrodes and portions of the resistive layer between the electrodes form series resistor chains disposed at peripheral regions of the touch sensor and surrounding a touch region of the touch sensor. The electrodes are formed by forming a conductive layer on the resistive layer in a thin-film deposition process, followed by patterning the conductive layer into the electrodes. A sheet resistivity of the resistive layer is between about 200Ω and about 800Ω. A sheet resistivity of the conductive layer is between about 0.03Ω and about 0.2Ω. A ratio of the sheet resistivity of the resistive layer to the sheet resistivity of the conductive layer is between about 2,500 and about 10,000.

20 Claims, 6 Drawing Sheets

5-WIRE RESISTIVE TOUCHSCREENS WITH METAL ELECTRODES

BACKGROUND OF THE INVENTION

Field of the Invention

Embodiments of the invention relate, generally, to touch sensors, and in particular to resistive touch sensor technology.

Background Art

Touch sensors are transparent or opaque input devices for computers and other electronic systems. As the name suggests, touch sensors are activated by touch, from either a user's finger, or a stylus or some other device. Transparent touch sensors, and specifically touchscreens, are generally placed over display devices, such liquid crystal displays, to create touch display systems. These systems are commonly used in commercial applications such as restaurant order entry systems, industrial process control applications, interactive museum exhibits, public information kiosks, cellular phones, personal digital assistants, and video games.

Capacitive is now the dominant touch technology, nevertheless resistive touchscreens maintain a significant market share due to their low-cost and extreme robustness to contaminants such as water splashes. 5-wire resistive touchscreens, in which the coversheet's only electrical role is to provide an electrical connection to a voltage sensing circuit, provide reliable performance even with heavy usage.

Robust 5-wire resistive touchscreens have been successfully manufactured for decades using a lead-based material referred to as "silver frit". However, trends towards environmentally friendly lead-free products are making this use of sliver frit unacceptable in the modern marketplace. There is a need to eliminate lead from 5-wire resistive touchscreen products that currently use silver frit.

BRIEF SUMMARY OF THE INVENTION

Embodiments to improve touch sensors are described herein. Some embodiments can include a device of a touch sensor. The device can include a resistive layer on a substrate. A sheet resistivity of the resistive layer can be between about 200Ω and about 800Ω. The device can further include a touch region on the resistive layer and a peripheral region between the touch region and a peripheral edge of the substrate. The peripheral region can include a resistor chain and an array of insulating regions between the series resistor chain and the touch region. The resistor chain can include a plurality of electrodes, each including a conductive layer on the resistive layer. A sheet resistivity of the conductive layer can be between about 0.03Ω and about 0.2Ω.

In some embodiments, a 5-wire resistive touchscreen can include a layer of indium tin oxide (ITO) on a transparent substrate and a plurality of electrodes disposed on the layer of ITO and adjacent to an edge of the layer of ITO. A sheet resistivity of the layer of ITO can be between about 360Ω and about 440Ω. A sheet resistivity of the plurality of electrodes can be between about 0.06Ω and about 0.1Ω. The plurality of electrodes and portions of the layer of ITO between adjacent electrodes of the plurality of electrodes can form a series resistor chain.

In some embodiments, a method for forming a touchscreen can include forming a resistive layer on a transparent substrate, removing portions of the resistive layer to form an array of insulating regions, forming a conductive layer on the resistive layer, and forming a resistor chain adjacent to the array of insulating regions. Forming the conductive layer can include controlling a ratio of a sheet resistivity of the resistive layer to a sheet resistivity of the conductive layer to be between about 2,500 and about 10,000. Forming the resistor chain can include patterning the conductive layer to form a plurality of electrodes.

These as well as additional features, functions, and details of various embodiments are described below. Similarly, corresponding and additional embodiments are also described below.

BRIEF DESCRIPTION OF THE DRAWINGS/FIGURES

Aspects of this disclosure are best understood from the following detailed description when read with the accompanying figures. It is noted that, in accordance with the common practice in the industry, various features are not drawn to scale. In fact, the dimensions of the various features may be arbitrarily increased or reduced for clarity of discussion.

DETAILED DESCRIPTION OF THE INVENTION

Figure 1:
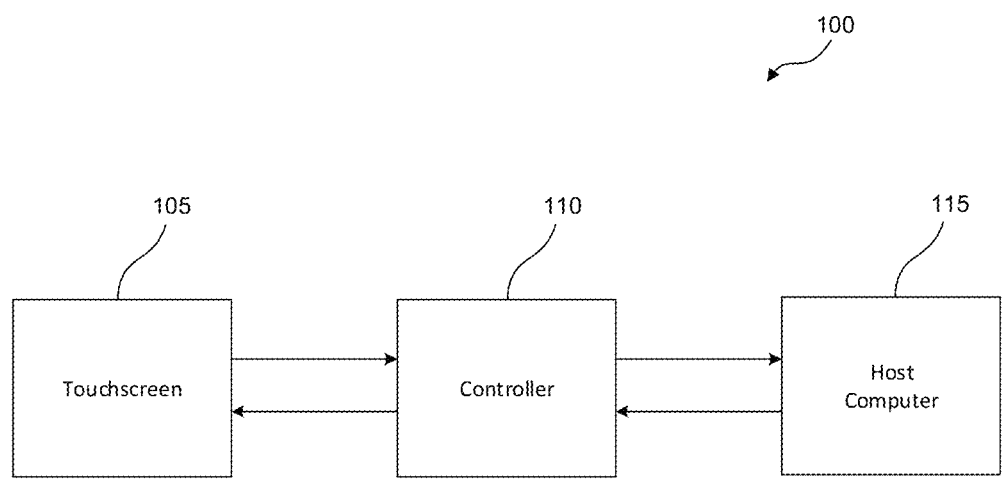
FIG. 1 illustrates a functional diagram of a touch system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the process for forming a first feature over a second feature in the description that follows can include embodiments in which the first and second features are formed in direct contact, and can also include embodiments in which additional features can be formed between the first and second features, such that the first and second features cannot be in direct contact. As used herein, the formation of a first feature on a second feature means the first feature is formed in direct contact with the second feature. In addition, the present disclosure can repeat reference numerals and/or letters in the various examples. This repetition does not in itself dictate a relationship between the various embodiments and/or configurations discussed.

Spatially relative terms, such as "beneath," "below," "lower," "above," "upper," and the like can be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein can likewise be interpreted accordingly.

It is noted that references in the specification to "one embodiment," "an embodiment," "an example embodiment," "exemplary," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to affect such feature, structure or characteristic in connection with other embodiments whether or not explicitly described.

It is to be understood that the phraseology or terminology herein is for the purpose of description and not of limitation, such that the terminology or phraseology of the present specification is to be interpreted by those skilled in relevant art(s) in light of the teachings herein.

In some embodiments, the terms "about" and "substantially" can indicate a value of a given quantity that varies within 5% of the value (e.g., ±1%, ±2%, ±3%, ±4%, ±5% of the value). These values are merely examples and are not intended to be limiting. The terms "about" and "substantially" can refer to a percentage of the values as interpreted by those skilled in relevant art(s) in light of the teachings herein.

One type of touchscreen, namely 5-wire resistive touchscreen, has been widely accepted for many touchscreen applications. In such a touchscreen, mechanical pressure from a finger or stylus causes a plastic membrane coversheet to flex and make physical contact with an underlying glass substrate. The glass substrate is coated with a resistive layer, upon which voltage gradients are excited via electrodes along the periphery of the substrate. In order to produce voltage gradients with high linearity across a touch region of a touchscreen, the electrodes are highly conductive and can be made by patterning a conductive layer disposed on the resistive layer. Conventionally, the conductive layer can be a silver frit coating formed by screen printing silver frit as a paste on the resistive layer, followed by sintering at a cure temperature. The conductive layer formed by such a 'thick-film' process can have a thickness of the order of 10 μm and a sheet resistivity as low as 0.003Ω.

The silver frit coating contains lead oxide to facilitate a relatively low cure temperature without compromising electrical properties of the resistive layer. However, starting from 2024, silver frit will no longer be exempted from the Restriction of Hazardous Substances (RoHS) lead-free requirements. One lead-free alternative is a silver frit based on a lead-free glass frit. However, lead-free glass frits have higher cure temperatures that can be problematic because the higher temperatures could damage the ITO and/or soda-lime glass substrate. Another alternative to silver frit is a conductive coating composed of polymer matrix loaded with silver. However, such a conductive coating lacks the robustness and reliability of silver frit coatings.

Another lead-free alternative for the conductive layer forming the electrodes can be a metal layer including highly conductive metal materials (e.g., aluminum, copper, or silver) and formed in a 'thin-film' deposition process, such as a sputtering process, an evaporation process, or an electroplating process. However, the thickness of the metal layer formed in such a manner can be limited by the deposition rate of the metal material in the 'thin-film' deposition process. Depositing a metal layer with a sufficient thickness to match the sheet resistivity of the silver frit coating can be time consuming and costly. For example, in practice, without a long and expensive deposition process, a sputtered metal layer cannot have a sheet resistivity as low as that of a screen-printed silver frit coating. On the other hand, a thin metal layer can have a relatively high sheet resistivity, which can cause reduction of a signal to noise ratio (SNR) and/or distortion of the linearity of the voltage gradients across the touch region, which adversely affect the performance of the touchscreen.

The embodiments described herein are directed to overcoming the challenges mentioned above. In some embodiments, the resistive layer can be formed to have a first sheet resistivity within a first range, and the conductive layer can be formed in a 'thin-film' deposition process to have a second sheet resistivity within a second range. The first and second ranges can be determined by considering manufacturing cost and feasibility of the resistive layer and the conductive layer, without compromising the performance of the touchscreen.

FIG. 1 illustrates a functional diagram of a touch system 100, in accordance with some embodiments. The touchscreen system 100 generally comprises a touchscreen 105 (i.e., a touch sensor having a transparent substrate) coupled to a controller 110. Controller 110 is can further be coupled to a host computer 115. Generally, controller 110 receives from touchscreen 105 analog signals carrying touch information. Controller 110 also sends excitation signals to touchscreen 105. Specifically, controller 110 establishes a voltage gradient across touchscreen 105. The voltages at the point of contact are representative of the position touched. Controller 110 digitizes these voltages and transmits these digitized signals, or touch information in digital form based on these digitized signals, to host computer 115 for processing.

Figure 2A:
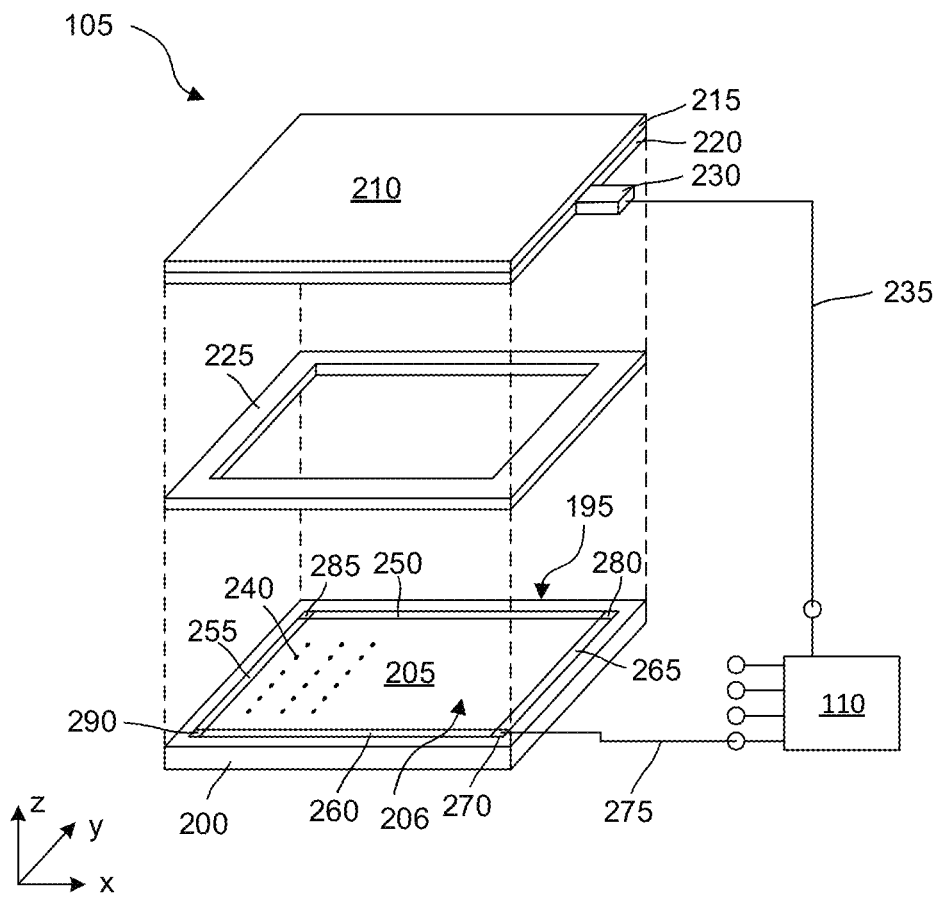
FIG. 2A illustrates an exploded view of a touchscreen, in accordance with some embodiments.

FIG. 2A illustrates an exploded view of touchscreen 105, in accordance with some embodiments. In some embodiments, touchscreen 105 can be a 5-wire touchscreen coupled a controller having five terminals. Touchscreen 105 comprises a gradient sheet 195 including a substrate 200 having a uniform resistive layer 205 permanently applied to one surface thereof. Resistive layer 205 further includes a touch region 206. In some embodiments, a sheet resistivity of resistive layer 205 can be between about 200Ω and about 800Ω. For example, the sheet resistivity of resistive layer 205 can be between about 200Ω and about 360Ω, between about 360Ω and about 440Ω, and between about 440Ω and about 800Ω. In some embodiments, the sheet resistivity of resistive layer 205 can be about 400Ω.

In some embodiments, substrate 200 can have a planar geometry, as shown in FIG. 2A. In some embodiments, the geometry of the substrate 200 can be contoured to match the face of a curved object, such as a cathode ray tube (CRT) face. In some embodiments, the geometry of the substrate 200 is implemented as a flat surface to match the face of a flat panel display such as an liquid crystal display (LCD). In some embodiments, substrate 200 can have a rectangular perimeter configuration, as shown in FIG. 2A. In some embodiments, substrate 200 can have other perimeter configurations. For example, the perimeter configurations of substrate 200 can be circular, elliptical, polygonal, irregular or a combination thereof. In some embodiments, the perimeter configurations of substrate 200 can include curved edges or curved corners. In some embodiments, substrate 200 can be made of a substantially transparent material to provide the necessary transparency. In some embodiments, if the resultant product is to be an opaque sensor, substrate 200 can be composed of an opaque material. In some embodiments, resistive layer 205 can be made of a substantially transparent material to provide the necessary transparency. For example, resistive layer 205 can include indium tin oxide (ITO).

A cover sheet 210 above resistive layer 205 can be joined to gradient sheet 195 by an insulating adhesive frame 225, which separated cover sheet 210 and resistive layer 205 by a distance substantially the same as a thickness of insulating adhesive frame 225. Cover sheet 210 can include a flexible film 215 with a conductive coating 220 on the underside of flexible film 215. An electrode 230 connected to conductive coating 220 can be electrically coupled to an external circuitry, such as controller 110, via an electrical wire 235. For example, electrical wire 235 can be coupled to one of the five electrodes of controller 110. In some embodiments, touch region 206 can include small transparent insulator islands 240 on resistive layer 205, which prevent accidental contact between conductive coating 220 and resistive layer 205.

While the embodiment depicted in FIG. 2A utilizes cover sheet 210, any conducting element, such as a conducting stylus (not shown), can be used as an alternative. This conducting stylus may be used when resistive layer 205 is sufficiently durable as to withstand damage from such contact. As another alternative, capacitive and/or resistive pickup systems can be used along with a user's finger or with an appropriate probe.

Figure 2B:
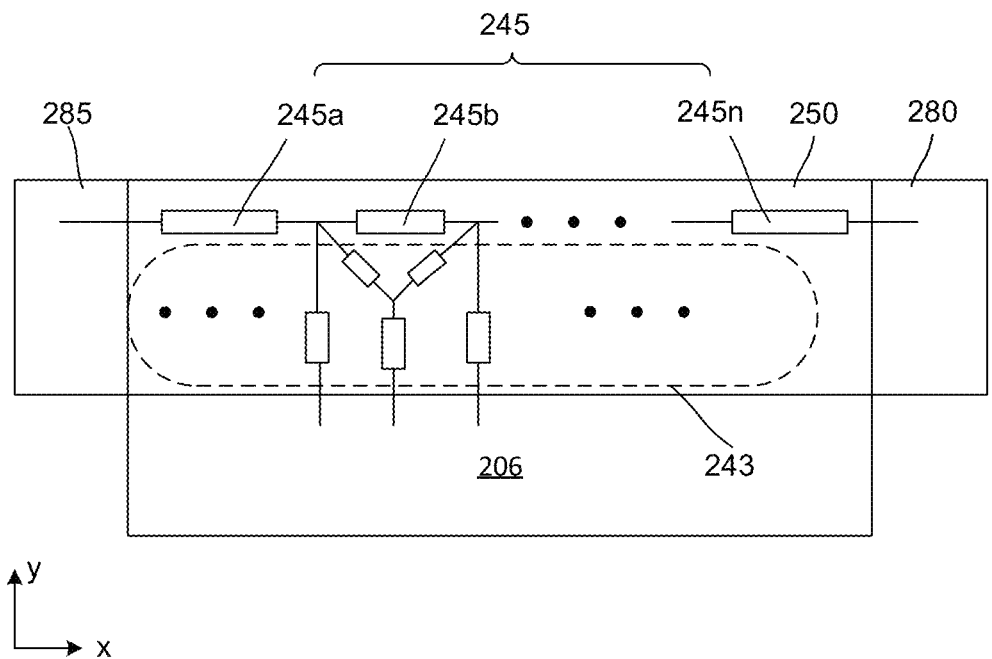
FIG. 2B illustrates a schematic diagram of a series resistor chain in a touchscreen, in accordance with some embodiments.

Referring to FIG. 2A, touch region 206 can be surrounded by a peripheral region including four peripheral edge regions 250, 255, 260, and 265. Each of the four peripheral edge regions 250, 255, 260, and 265 can include a resistor chain spaced along each edge of resistive layer 205 and is used for applying potentials to resistive layer 205, so as to create orthogonal voltage gradients across touch region 206. FIG. 2B illustrates a schematic diagram of a resistor chain 245 in peripheral edge region 250, in accordance with some embodiments. Resistor chain 245 can include resistors 245a, 245b, . . . , and 245n connected in series. The resistance of the resistors 245a, 245b, . . . , and 245n can depend upon the sheet resistivity of resistive layer 205, and can vary in accordance with design requirements. FIG. 2B further illustrates that resistor chain 245 can be coupled to touch region 206 via a resistor network 243. It may be noted that none of the resistors of FIG. 2B are surface-mount resistor components as found on a circuit board, but instead all correspond to electrical resistances due to various geometries of conducting, resistive and insulation areas.

Referring to FIGS. 2A and 2B, the resistor chains in peripheral edge regions 250, 255, 260 or 265 are joined at or near the corners of the resistive layer 205 by electrical leads 270, 280, 285, and 290, which are electrically coupled to four of the five terminal of controller 110 via electrical wires. For simplicity and illustration purposes, only an electrical wire 275 is shown in FIG. 2A to couple electrical lead 270 to controller 110, whereas the electrical wires coupling electrical leads 280, 285, and 290 to controller 110 are not shown.

Via the electrical wires and electrical leads 270, 280, 285, and 290, controller 110 can provide voltage signals to the resistor chains in peripheral edge regions 250, 255, 260 or 265. Via electrical wire 235, controller 110 can sense voltage signals provided by cover sheet 210 and process information from touchscreen 105. When touchscreen 105 is pressed, conductive coating 220 of cover sheet 210 makes direct electrical contact with resistive layer 205 at a contact location. Cover sheet 210 can function as either a voltage sensing probe for sensing a voltage at the contact location, or as a current injection source at the contact location, and can measure x- and y-coordinates of the contact location. For example, to measure the x coordinate, controller 110 can generate a voltage gradient across touch region 206 along the x direction by applying a first voltage (e.g., 5 V) to electrical leads 270 and 280, while applying a second voltage different from the first voltage (e.g., 0 V) to electrical leads 285 and 290, such that the voltage measured by cover sheet 210 can indicate the x-coordinate of the contact location. Similarly, to measure the y-coordinate, controller 110 can generate the voltage gradient across touch region 206 along the y direction by applying the first voltage to electrical leads 280 and 285, while applying the second voltage to electrical leads 270 and 290, such that the voltage measured by cover sheet 210 indicates the y-coordinate of the contact location. In some embodiments, the voltage gradient across touch region 206 can have a high linearity, such that the voltage measured by cover sheet 210 is linear with the x- and y-coordinates of the contact location. In some embodiments, a quality of the linearity of the voltage gradient across touch region 206 can affect an accuracy of the measurement of the x- and y-coordinates of the contact location. In some embodiments, the linearity of the voltage gradient across touch region 206 can be determined by resistor chain 245 and resistor network 243, as described with reference to FIG. 2B. In some embodiments, resistor in resistor network 243 can be designed to have values according to a parabolic relation to facilitate the linearity of the voltage gradient across touch region 206.

Figure 3:
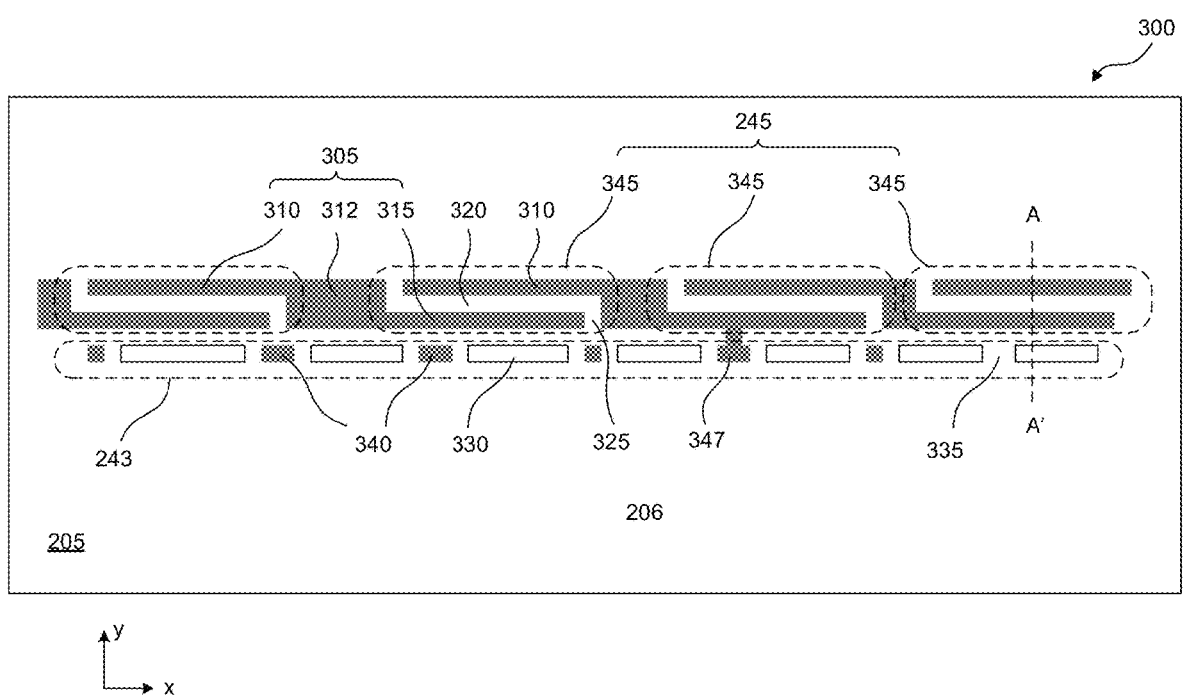
FIG. 3 illustrates a plane view of a portion of a series resistor chain in a touchscreen, in accordance with some embodiments.

FIG. 3 illustrates a plane view 300 of a portion of peripheral edge region 250 in a touchscreen, in accordance with some embodiments. The description of elements with the same reference numbers in FIGS. 2A and 2B applies in FIG. 3, unless mentioned otherwise. The portion of peripheral edge region 250 includes resistors 345 forming resistor chain 245 and a portion of resistor network 243. Resistor chains 245 can include a number of Z-shaped electrodes 305, each having an outer portion 310, an inner portion 315, and a middle portion 312 connecting outer portion 310 and inner portion 315. Each of resistor 345 can include an inner portion 315 of a first electrode 305, an outer portion 310 of a second, adjacent electrode 305, and a resistive region 320 between them. In some embodiments, resistive region 320 can be a portion of resistive layer 205 that is uncovered by electrodes 305. In some embodiments, the resistance of resistor 345 can depend on the sheet resistivity of resistive layer 205 and geometry factors (e.g., a width, a length, and a thickness) of resistive region 320. In some embodiments, geometry factors of resistive region 320 can be related to geometry factors of electrodes 305 and can vary among different resistors 345. In some embodiments, the resistance of resistor 345 can also be affected by a sheet resistivity and geometry factors of electrodes 305. In some embodiments, geometry factors of different electrodes 305 can vary. In some embodiments, electrodes 305 can include a conductive layer. In some embodiments, electrodes 305 can include a metal or a metallic alloy, such as aluminum (Al), copper (Cu), silver (Ag), molybdenum (Mo), titanium (Ti), chromium (Cr), platinum (Pt), gold (Au), tungsten (W), or a combination thereof. In some embodiments, electrodes 305 can include a sputtered metal. In some embodiments, electrodes 305 can be formed by a thin-film deposition process. In some embodiments, a sheet resistivity of the conductive layer of electrodes 305 can be between about 0.03Ω and about 0.2Ω. For example, the sheet resistivity of the conductive layer of electrodes 305 can be between about 0.03Ω and about 0.06Ω, between about 0.06Ω and about 0.1Ω, between about 0.1Ω and about 0.15Ω, and between about 0.15Ω and about 0.2Ω. In some embodiments, the sheet resistivity of the conductive layer of electrodes 305 can be between about 0.08Ω.

Adjacent electrodes 305 can be separated from each other by junctions 325. A plurality of insulating regions 330 can be formed between resistor chain 245 and touch region 206, for example, by removing the resistive layer 205 at selected places. Portions of resistive layer 205 remain between adjacent insulating regions 330 are referred to herein as gaps 335. Some gaps 335 are positioned between inner portions 315 of the electrodes 305 and touch region 206 (referred to as "non-junction gaps") while some other gaps 335 are positioned between junctions 325 and touch region 206 (referred to as "junction gaps").

In some embodiments, gaps 335 can have different configurations. In some embodiments, a gap 335 can include a conductive island 340. In some embodiments, the size and/or shape of conductive islands 340 in different gaps 335 can be different. In some embodiments, a non-junction gap 335 can include a T-shaped electrode 347 coupled to an inner portions 315 of an electrode 305 adjacent to the non-junction gap 335. In some embodiments, the size of T-shaped electrodes 347 in different non-junction gaps 335 can be different. In some embodiments, conductive islands 340 and T-shaped electrodes 347 can include the same materials and have the same sheet resistivity as electrodes 305. In some embodiments, a gap 335 can include no additional element on the portion of resistive layer 205 in gap 335. In some embodiments, the different configurations of gap 335 can be selected to improve the linearity of the voltage gradient across touch region 206.

Figure 4:
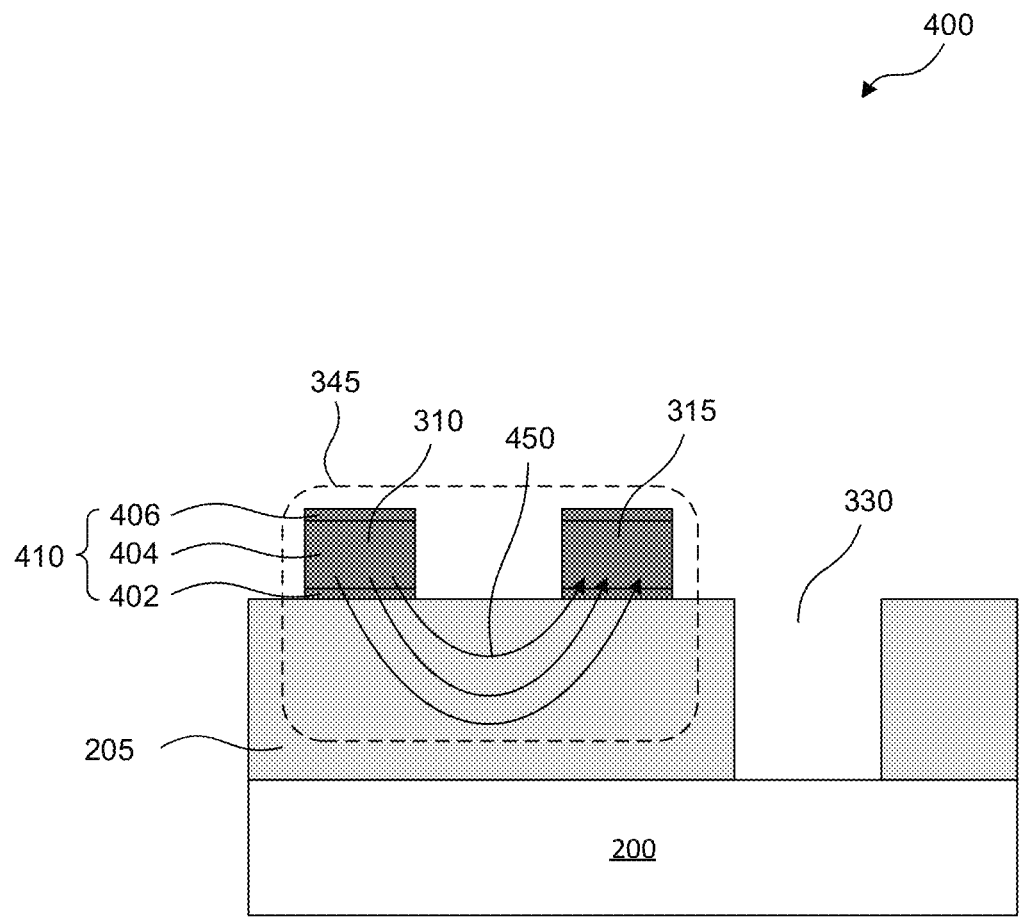
FIG. 4 illustrates a cross-sectional view of the series resistor chain in FIG. 3, in accordance with some embodiments.

FIG. 4 illustrates a cross sectional view 400 of a resistor 345 and an adjacent insulating region 330 along an A-A' line, as described with reference to FIG. 3. Description of elements with the same reference numbers in FIGS. 2A, 2B, and 3 applies to those in FIG. 4, unless mentioned otherwise. As shown in FIG. 4, resistive layer 205 can be disposed on substrate 200. Resistor 345 can include outer portion 310 and inner portion 315 of a pair of adjacent electrodes 305 disposed on resistive layer 205, together with a portion of resistive layer 205 between outer portion 310 and inner portion 315. An opening in resistive layer 205 adjacent to outer portion 310 of electrode 305 can form insulating region 330.

Referring to FIG. 4, in some embodiments, a conductive layer 410 forming electrodes 305 can include an adhesive layer 402, a metal layer 404, and a capping layer 406. In some embodiments, conductive layer 410 can be formed by sequentially depositing adhesive layer 402, metal layer 404, and capping layer 406 on resistive layer 205 by a thin-film deposition process, such as a sputtering process, an evaporation process, an electroplating process, or a combination thereof. In some embodiments, adhesive layer 402 can include a metallic material that can strongly adhere on resistive layer 205, such as Mo, Ti, Cr, or a combination thereof. In some embodiments, a thickness of adhesive layer 402 can be between about 5 nm and about 50 nm. In some embodiments, metal layer 404 can include a metallic material with a high conductivity, such as Al, Cu, Ag, or a combination thereof. In some embodiments, a thickness of metal layer 404 can be between about 100 nm and about 1000 nm. In some embodiments, capping layer 406 can include a metallic material with an inert chemical property (e.g., resistive to oxidation/corrosion), such as Mo, Au, Cr, Pt, or a combination thereof. In some embodiments, a thickness of metal layer 404 can be between about 5 nm and about 50 nm.

Referring to FIG. 4, within resistor 345, an electrical current 450 can flow between outer portion 310 of one electrode and inner portion 315 of another electrode through resistive layer 205. In some embodiments, due to a non-negligible sheet resistivity of conductive layer 410, in addition to the resistance of resistive layer 205, resistances of electrodes 305 can have non-negligible contribution to a total resistance of resistor 345. In some embodiments, the non-negligible resistance of electrodes 305 can give rise to non-negligible deviation of the resistance of resistor 345 from a designed value, which can reduce an SNR of sensing the voltage at the contact location, especially if a thickness of electrodes 305 is lower, corresponding to a higher resistance of electrodes 305.

In some embodiments, both conductive layer 410 and resistive layer 205 can have a thin-film geometry, and their electrical resistivities can be analyzed according to their sheet resistivities. A sheet resistivity of a thin film refers to a ratio of a bulk resistivity of the material composing the thin film to a thickness of the thin film. In some embodiments, thicker conductive layer 410 corresponds to a sheet resistivity of electrodes 305, which can provide a better SNR. However, forming electrodes 305 with a greater thickness in a thin-film deposition process can cause longer deposition time, which can increase the manufacturing cost. In some embodiments, thinner resistive layer 205 can increase a sheet resistivity of resistive layer 205, reducing the impact of the non-negligible resistance of electrodes 305. However, manufacturing resistive layer 205 with a smaller thickness while maintaining a uniform thickness across a large area can be challenging. This is because a relative variation of the thickness becomes more significant for a thinner layer. In some embodiments, reducing an overall uniformity of resistive layer 205 across substrate 200 can affect the reliability of the performance of the touch sensor at different contact locations.

In some embodiments, ranges of the sheet resistivities of resistive layer 205 and conductive layer 410 can be determined to yield a reliable functionality of touchscreen 105 without compromising the SNR to an unacceptable extend, while maintaining reasonable manufacturing cost and feasibility. In some embodiments, a figure of merit (FOM) defined as a ratio of the resistivity of resistive layer 205 to the sheet resistivity of conductive layer 410 can be determined to yield an acceptable SNR and a reliable functionality while maintaining reasonable manufacturing cost and feasibility.

Figure 5:
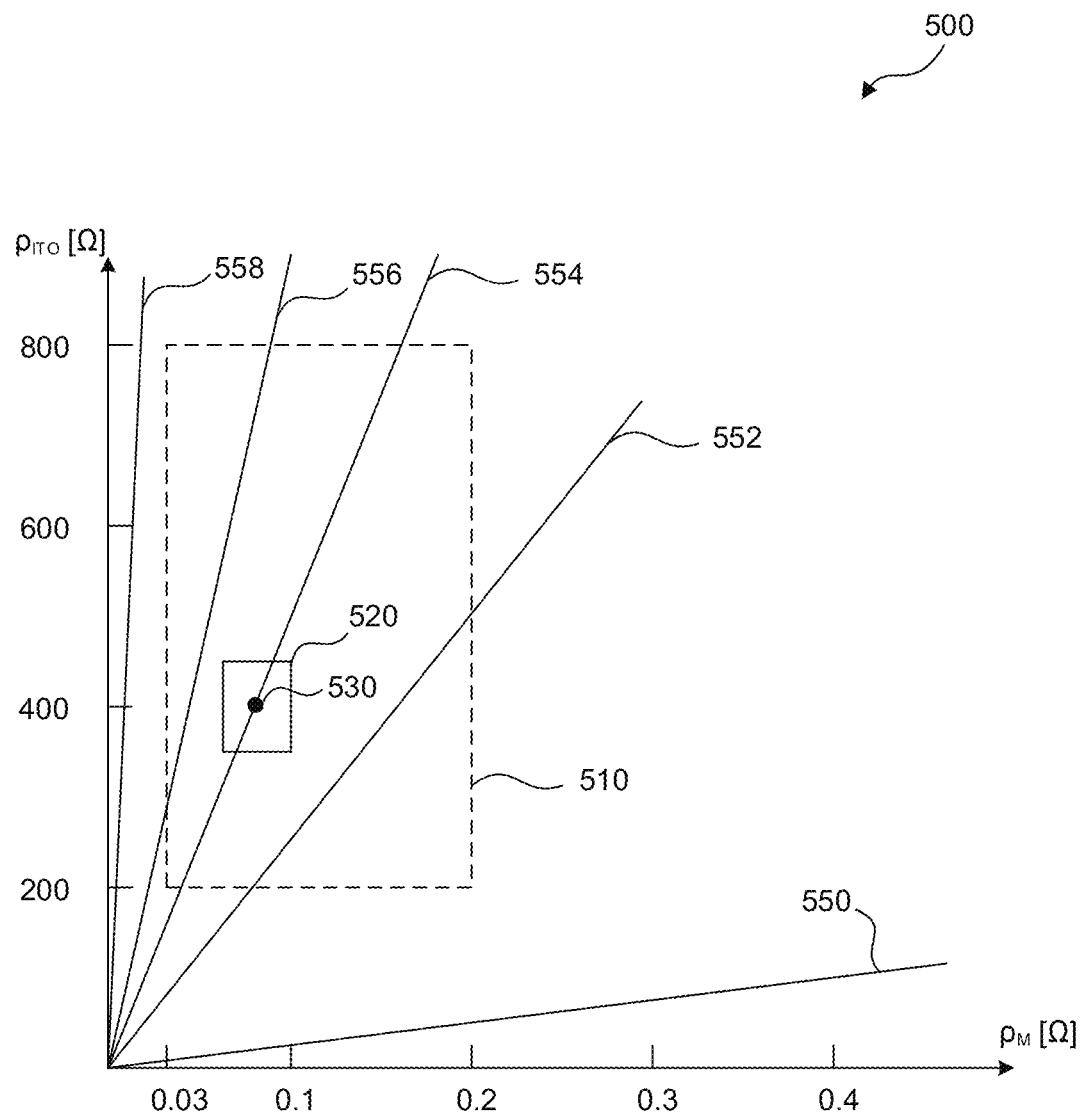
FIG. 5 illustrates a diagram about design ranges of sheet resistivities of metal and ITO, in accordance with some embodiments.

FIG. 5 illustrates a diagram 500 illustrating design ranges according to the sheet resistivities of conductive layer 410 (e.g., metal) and resistive layer 205 (e.g., ITO), in accordance with some embodiments. In diagram 500, a horizontal axis $\rho_M$ indicates the sheet resistivity of conductive layer 410, and a vertical axis $\rho_{ITO}$ indicates the sheet resistivity of resistive layer 205, both in the unit of Ω. Diagram 500 includes a box 510 with dashed edges and represents ranges of $0.03\Omega < \mu_M < 0.2\Omega$ and $200\Omega < \rho_{ITO} < 800\Omega$. In some embodiments, values of the sheet resistivities of conductive layer 410 and resistive layer 205 selected within box 510 yield an acceptable SNR and a reliable functionality of touchscreen 105 while maintaining reasonable manufacturing cost and feasibility. In some embodiments, if the sheet resistivity of conductive layer 410 is greater than 0.2Ω, the SNR may be compromised to an unacceptable extent, causing detrimental performance of touchscreen 105. In some embodiments, if the sheet resistivity of conductive layer 410 is less than 0.03Ω, the cost of forming conductive layer 410 by a thin-film deposition process may be too high due to the thickness of conductive layer 410. In some embodiments, if the sheet resistivity of resistive layer 205 is less than 200Ω, the SNR may be sacrificed to an unacceptable extent due to non-negligible influence from the resistance of electrodes 305, causing detrimental performance of touchscreen 105. In some embodiments, if the sheet resistivity of resistive layer 205 is greater than 800Ω, the manufacturing of resistive layer 205 with a uniform thickness across a large area may be too challenging to be feasible, due to the small thickness of resistive layer 205.

Diagram 500 also includes a box 520 with solid edges and represents ranges of 0.06Ω<$\rho_M$<0.1Ω and 360Ω<$\rho_{ITO}$<440Ω. Box 520 is within box 510. In some embodiments, the sheet resistivities of conductive layer 410 and resistive layer 205 within box 510 can be selected by further considering the trade-off and optimization among factors such as the reliability of the functionality of touchscreen 105 and its manufacturing cost and feasibility. In some embodiments, the sheet resistivities of conductive layer 410 and resistive layer 205 selected within box 510 can provide optimized SNR and reliability of touchscreen 105 and easiness and less cost of its manufacture. Box 510 includes a data point 530 at $\rho_M$=0.08Ω and $\rho_{ITO}$=400Ω. In some embodiments, the sheet resistivities of conductive layer 410 and resistive layer 205 represented by data point 530 yields a reliable functionality of a prototype touchscreen, of which the manufacture is feasible and cost-efficient.

In some embodiments, the FOM can be an important index to evaluate the design ranges of $\rho_{ITO}$ and $\rho_M$. In some embodiments, if the value of the FOM is too low, the contribution of resistance of electrode 305 can be too large to guarantee reliable functionality of touchscreen 105. On the other hand, in some embodiments, a high value of the FOM indicates a low contribution of resistance of electrode 305, yet if the value of the FOM is too high, the fabrication of electrode 305 can be too costly, and/or the fabrication of resistive layer 205 can be too difficult to yield a uniform thickness across a large area. Diagram 500 also includes lines 550 and 558 representing FOM=250 and FOM=55, 000, respectively. Lines 550 and 558 do not cross box 510. In some embodiments, FOM=250 as represented by line 550 can be too low, such that the total resistance of resistor 345 includes a contribution from the resistance of electrode 305 large enough to compromise the SNR of touchscreen 105 to an unacceptable extend. In some embodiments, FOM=55, 000 as represented by line 558 can be too high, such that the fabrication of electrode 305 requires costly deposition of a great thickness of conductive layer 410, or the fabrication of resistive layer 205 is too difficult to yield a uniform thickness across a large area, impacting the performance of touchscreen 105.

A FOM of 55,000 is typical of a 5-wire resistive touchscreens using lead-containing silver frit. Such a value of the FOM is not typically feasible for thin-film metal electrodes, of which the FOA can be lower by about an order of magnitude, such as about 2,500 to about 10,000. Through experimental testing of prototype touchscreens, a thin-film metal electrode with FOM of about 2,500 to about 10,000 can provide a performance of a touch screen system comparable with those provided by silver frit electrodes having an FOM an order of magnitude higher.

Diagram 500 further includes lines 552, 554, and 556. Line 552 represents FOM=2,500, line 554 represents FOM=5,000, and Line 556 represents FOM=10,000. Lines 552, 554, and 556 cross box 510. In particular, line 554 cross data point 530 in box 520. In some embodiments, a combination of the sheet resistivities of conductive layer 410 and resistive layer 205 according to values of FOM represented by lines 552, 554, and 556 can ensure a reliable functionality of touchscreen 105 with easiness and low-cost of its manufacture.

Figure 6:
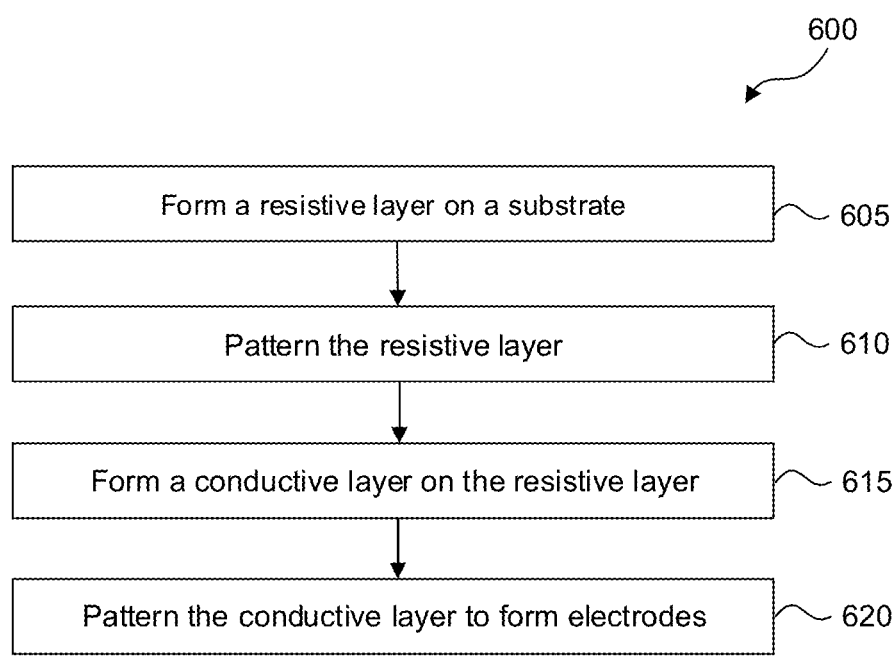
FIG. 6 illustrates a flowchart of a method for fabricating a touchscreen, in accordance with some embodiments.

According to some embodiments, FIG. 6 illustrates a flowchart of a method 600 for manufacturing touchscreen 105. In particular, method 600 focuses on fabricating resistive layer 205 and conductive layer 410 of touchscreen 105, as described with reference to FIGS. 2A, 3, and 4 for illustrative purposes. This disclosure is not limited to this operational description. Other fabrication operations can be performed between the various operations of method 600 and are omitted merely for clarity. Moreover, not all operations may be needed to perform the disclosure provided herein. Additionally, some of the operations may be performed simultaneously, or in a different order than the ones shown in FIG. 6. In some embodiments, one or more other operations may be performed in addition to or in place of the presently described operations.

Referring to FIG. 6, method 600 begins with operation 605 and the process of forming a resistive layer on a substrate. For example, resistive layer 205 can be formed by depositing ITO on substrate 200 in a thin-film deposition process, such as a sputtering process or an evaporation process. The deposition of ITO can be performed in a deposition chamber providing a vacuum environment. In some embodiments, forming resistive layer 205 can include controlling deposition parameters (e.g., a deposition time, a deposition rate, a temperature of the substrate, and/or a pressure of the deposition chamber) to control properties (e.g., a thickness, a roughness, a denseness, and/or a purity) of resistive layer 205, in order to ensure that the sheet resistivity of resistive layer 205 is in accordance with a requirement of design (e.g., in the range of $\rho_{ITO}$ as described with reference to FIG. 5). In some embodiments, forming resistive layer 205 can include doping resistive layer 205 to adjust its sheet resistivity or transparency.

Referring to FIG. 6, method 600 proceeds with operation 610 and the process of patterning the resistive layer. For example, a photolithography process can be performed by applying a mask (e.g. a photoresist) on resistive layer 205, followed by removing portions of resistive layer 205 uncovered by the mask to form insulating regions 330. In some embodiments, the removal of the portions of resistive layer 205 can involve a dry etching process, a wet etching process, or a combination thereof.

Referring to FIG. 6, method 600 proceeds with operation 615 and the process of forming a conductive layer on the resistive layer. For example, conductive layer 410 can be formed on resistive layer 205 by depositing one or more metal materials on resistive layer 205 in a thin-film deposition process, such as a sputtering process, an evaporation process, an electroplating process, or a combination thereof. In some embodiments, forming conductive layer 410 can include sequential deposition of adhesive layer 402, metal layer 404, and capping layer 406. In some embodiments, forming conductive layer 410 can include controlling the deposition parameters to control thicknesses of adhesive layer 402, metal layer 404, and capping layer 406, in order to ensure that the sheet resistivity of conductive layer 410 is in accordance with a requirement of design (e.g., in the range of $\rho_M$ as described with reference to FIG. 5). In some embodiments, an isolation layer can optionally be formed on conductive layer 410 to protect conductive layer 410 from oxidation. In some embodiments, the isolation layer can be formed by depositing a dielectric layer over conductive layer 410. In some embodiments, the isolation layer can be formed by oxidizing a few outmost atomic layers of capping layer 406 to form a dense oxide layer over capping layer 406.

Referring to FIG. 6, method 600 proceeds with operation 620 and the process of pattering the conductive layer. For example, conductive layer 410 can be patterned to form electrodes 305. In some embodiments, patterning conductive layer 410 can include performing a photolithography process by applying a mask (e.g. a photoresist) on conductive layer 410, followed by removing portions of conductive layer 410 uncovered by the mask. In some embodiments, conductive islands 340 and T-shaped electrodes 347 can also be formed by the photolithography process. In some embodiments, the removal of the portions of conductive layer 410 can involve a dry etching process, a wet etching process, or a combination thereof. In some embodiments, pattering conductive layer 410 can include applying the mask on resistive layer 205 prior to the deposition of conductive layer 410 and a lift-off process after the deposition of conductive layer 410.

As noted above, photolithography can be used in operation 610 and operation 620 of method 600. Use of photolithography in these operations has the advantage of producing electrode patterns with great dimensional accuracy compared to, for example, screen-printing.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A touch sensor, comprising:
   a resistive layer on a substrate, wherein a sheet resistivity of the resistive layer is between about 200Ω and about 800 Ω;
   a touch region on the substrate; and
   a peripheral region between the touch region and an edge of the substrate, wherein the peripheral region comprises:
   a series resistor chain comprising a plurality of electrodes, wherein each of the plurality of electrodes comprises a conductive layer on the resistive layer, and wherein a sheet resistivity of the conductive layer is between about 0.03Ω and about 0.2Ω; and
   an array of insulating regions between the series resistor chain and the touch region.

2. The touch sensor of claim 1, wherein the sheet resistivity of the resistive layer is about 400 Ω.

3. The touch sensor of claim 1, wherein the sheet resistivity of the conductive layer is about 0.08Ω.

4. The touch sensor of claim 1, wherein a ratio of the sheet resistivity of the resistive layer to the sheet resistivity of the conductive layer is between about 2,500 and about 10,000.

5. The touch sensor of claim 1, wherein a ratio of the sheet resistivity of the resistive layer to the sheet resistivity of the conductive layer is about 5,000.

6. The touch sensor of claim 1, wherein the conductive layer comprises a sputtered metal.

7. The touch sensor of claim 1, wherein the resistive layer comprises indium tin oxide.

8. The touch sensor of claim 1, wherein the conductive layer comprises a metal layer, wherein the metal layer comprises aluminum, copper, silver, or a combination thereof.

9. The touch sensor of claim 8, wherein the conductive layer further comprises an adhesive layer between the metal layer and the resistive layer, wherein the adhesive layer comprises molybdenum, titanium, chromium, or a combination thereof.

10. The touch sensor of claim 8, wherein the conductive layer further comprises a capping layer on the metal layer, wherein the capping layer comprises molybdenum, chromium, platinum, gold, or a combination thereof.

11. A 5-wire resistive touchscreen, comprising:
    a layer of indium tin oxide (ITO) on a transparent substrate, wherein a sheet resistivity of the layer of ITO is between about 360Ω and about 440Ω; and
    a plurality of electrodes disposed adjacent to an edge of the layer of ITO, wherein the plurality of electrodes and portions of the layer of ITO between adjacent electrodes of the plurality of electrodes form a series resistor chain, and wherein a sheet resistivity of the plurality of electrodes is between about 0.06Ω and about 0.1Ω.

12. The 5-wire resistive touchscreen of claim 11, wherein the sheet resistivity of the layer of ITO is about 400 Ω.

13. The 5-wire resistive touchscreen of claim 11, wherein the sheet resistivity of the plurality of electrodes is about 0.08Ω.

14. The 5-wire resistive touchscreen of claim 11, wherein a thickness of the plurality of electrodes is between about 100 nm and about 1 μm.

15. The 5-wire resistive touchscreen of claim 11, wherein each of the plurality of electrodes comprises aluminum, copper, silver, titanium, molybdenum, or a combination thereof.

16. The 5-wire resistive touchscreen of claim 11, wherein each of the plurality of electrodes comprises:
an adhesive layer on the layer of ITO;
a metal layer on the adhesive layer; and
a capping layer on the metal layer.

17. A method for forming a touchscreen, comprising:
forming a resistive layer on a transparent substrate;
removing portions of the resistive layer to form an array of insulating regions;
forming a conductive layer on the resistive layer, wherein forming the conductive layer comprises controlling a ratio of a sheet resistivity of the resistive layer to a sheet resistivity of the conductive layer to be between about 2,500 and about 10,000;
forming a resistor chain adjacent to the array of insulating regions by patterning the conductive layer to form a plurality of electrodes.

18. The method of claim 17, wherein forming the conductive layer comprises depositing a metallic material by a sputter process, an evaporation process, an electroplating process, or a combination thereof.

19. The method of claim 17, wherein controlling the ratio comprises controlling a thickness of the conductive layer.

20. The method of claim 17, wherein forming the conductive layer comprises:
forming an adhesive layer on the resistive layer;
forming a metal layer on the adhesive layer; and
forming a capping layer on the metal layer.

* * * * *